(12) United States Patent
Nakazawa (10) Patent No.: US 10,402,785 B2
(45) Date of Patent: Sep. 3, 2019

(54) TERMINAL APPARATUS

(71) Applicant: FUJI XEROX CO., LTD., Tokyo (JP)

(72) Inventor: Shinsuke Nakazawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 69 days.

(21) Appl. No.: 15/356,153

(22) Filed: Nov. 18, 2016

(65) Prior Publication Data

US 2017/0371705 A1    Dec. 28, 2017

(30) Foreign Application Priority Data

Jun. 23, 2016   (JP) .................................. 2016-124637

(51) Int. Cl.
   *G06F 9/46*        (2006.01)
   *G06Q 10/10*       (2012.01)

(52) U.S. Cl.
   CPC .................... *G06Q 10/101* (2013.01)

(58) Field of Classification Search
   CPC ...................................................... G06F 9/4881
   USPC ......................................................... 718/103
   See application file for complete search history.

(56) References Cited

U.S. PATENT DOCUMENTS

| | | | | |
|---|---|---|---|---|
| 6,735,700 B1 * | 5/2004 | Flint | ........................ | G06F 21/56 713/188 |
| 8,005,889 B1 * | 8/2011 | Issa | ........................ | H04L 67/104 709/201 |
| 8,010,555 B2 * | 8/2011 | Eichhorn | ............ | G06F 17/3028 707/770 |
| 8,340,999 B2 * | 12/2012 | Kumaran | ................ | G06Q 10/10 705/7.11 |
| 2001/0021913 A1 * | 9/2001 | Leymann | ................ | G06Q 10/10 718/103 |
| 2003/0011601 A1 * | 1/2003 | Itoh | ........................ | G06T 11/206 345/440 |
| 2003/0174165 A1 * | 9/2003 | Barney | .................. | G06T 11/206 715/747 |
| 2008/0052379 A1 * | 2/2008 | Matsuyama | ............ | H04L 41/22 709/218 |
| 2008/0189094 A1 * | 8/2008 | Adir | ................ | G01R 31/318371 703/14 |
| 2008/0281182 A1 * | 11/2008 | Rabben | .................. | G03B 42/06 600/407 |
| 2009/0113394 A1 * | 4/2009 | Weber | ........................ | G06F 8/10 717/126 |
| 2009/0177508 A1 * | 7/2009 | Leung | .................... | G06Q 10/04 717/126 |

(Continued)

FOREIGN PATENT DOCUMENTS

| | | |
|---|---|---|
| JP | H11-102342 A | 4/1999 |
| JP | 2000-330880 A | 11/2000 |
| JP | 2003-330857 A | 11/2003 |

*Primary Examiner* — Mehran Kamran
(74) *Attorney, Agent, or Firm* — Oliff PLC (57) ABSTRACT

A terminal apparatus includes a storage generation unit that generates a storage module that stores, in association with information concerning a process related to a job that is performed by executing multiple processes in a sequential order, and information concerning a process to be performed with a system connected from among the multiple processes, screen data of the system used in the process with the system connected and a display controller that performs control to display the screen data if the system is unconnectable when a request to execute the process is received.

18 Claims, 6 Drawing Sheets

(56) References Cited

U.S. PATENT DOCUMENTS

| | | | |
|---|---|---|---|
| 2010/0005160 A1* | 1/2010 | Sparks | H04L 41/12 709/222 |
| 2010/0114811 A1* | 5/2010 | Lambov | G06N 5/02 706/48 |
| 2010/0161717 A1* | 6/2010 | Albrecht | G06F 17/30902 709/203 |
| 2011/0078650 A1* | 3/2011 | Weber | G06Q 10/06 717/104 |
| 2011/0274320 A1* | 11/2011 | Pace | G06F 17/30247 382/128 |
| 2012/0066662 A1* | 3/2012 | Chao | G06F 8/10 717/104 |
| 2012/0124034 A1* | 5/2012 | Jing | G06F 17/30265 707/722 |
| 2012/0315954 A1* | 12/2012 | Ahn | G06F 1/1694 455/556.1 |
| 2013/0103786 A1* | 4/2013 | Miglore | G06F 17/30 709/217 |
| 2013/0124265 A1* | 5/2013 | Whitehair | G06Q 10/06 705/7.36 |
| 2013/0159123 A1* | 6/2013 | Hochberg | G06Q 30/06 705/26.1 |
| 2013/0226977 A1* | 8/2013 | Ishikawa | G06F 17/30011 707/827 |
| 2013/0238384 A1* | 9/2013 | Caesar | G06F 8/34 705/7.27 |
| 2014/0250148 A1* | 9/2014 | Eichhorn | G06F 17/3028 707/770 |
| 2014/0314337 A1* | 10/2014 | Miyake | H04N 1/00161 382/309 |
| 2014/0379495 A1* | 12/2014 | Fielder | G06Q 30/0277 705/14.73 |
| 2015/0092784 A1* | 4/2015 | Nakata | H04L 67/104 370/400 |
| 2015/0161087 A1* | 6/2015 | Khoo | G06F 17/30899 715/234 |
| 2015/0161444 A1* | 6/2015 | Gallup | G06K 9/00624 707/752 |
| 2016/0042678 A1* | 2/2016 | Liu | G09G 3/20 345/205 |
| 2016/0292041 A1* | 10/2016 | Bender | G06F 11/1451 |
| 2017/0111240 A1* | 4/2017 | Qin | H04L 41/5054 |
| 2017/0277742 A1* | 9/2017 | Arkhipova | G06F 17/30115 |
| 2017/0331907 A1* | 11/2017 | Jagannath | H04L 67/16 |

\* cited by examiner

| ACCESS INFORMATION TO CORE SYSTEM |
|---|
| CORE SYSTEM 12a |
|     URL |
|     USER INFORMATION |
|     ACCESS CRITERIA |
| CORE SYSTEM 12b |
|     URL |
|     USER INFORMATION |
|     ACCESS CRITERIA |
| CORE SYSTEM 12c |
|     • • • • • |
| DOCUMENT FILE |
|     OPERATION MANUAL OF GENERAL OPERATION |
|     MANUAL OF CORE SYSTEM 12a |
|     TEMPLATE OF DOCUMENT FOR CORE SYSTEM 12b |
|     • • • • • |
| CACHE OF SCREEN DATA |
| CORE SYSTEM 12a |
|     SCREEN DATA (HTML, IMAGE, AND THE LIKE) |
|     LATEST ACQUISITION TIME AND DATE |
| CORE SYSTEM 12b |
|     • • • • • |
| INPUT INFORMATION TO CACHE OF SCREEN DATA |
| CORE SYSTEM 12a (AUTOMATICALLY REFLECTING) |
|     INPUT VALUE 1 |
|     INPUT VALUE 2 |
|     • • • • • |
| CORE SYSTEM 12a (NOT AUTOMATICALLY REFLECTING) |
|     INPUT VALUE 11 |
|     INPUT VALUE 12 |
|     • • • • • |
| CORE SYSTEM 12b (AUTOMATICALLY REFLECTING) |
|     • • • • • |

TERMINAL APPARATUS

CROSS-REFERENCE TO RELATED APPLICATIONS

This application is based on and claims priority under 35 USC 119 from Japanese Patent Application No. 2016-124637 filed Jun. 23, 2016.

BACKGROUND

Technical Field

The present invention relates to a terminal apparatus.

SUMMARY

According to an aspect of the invention, there is provided a terminal apparatus. The terminal apparatus includes a storage generation unit that generates a storage module that stores, in association with information concerning a process related to a job that is performed by executing multiple processes in a sequential order, and information concerning a process to be performed with a system connected from among the multiple processes, screen data of the system used in the process with the system connected, and a display controller that performs control to display the screen data if the system is unconnectable when a request to execute the process is received.

BRIEF DESCRIPTION OF THE DRAWINGS

Exemplary embodiment of the present invention will be described in detail based on the following figures, wherein.

DETAILED DESCRIPTION

An exemplary embodiment of the present invention is described in detail with reference to the drawings.

Figure 1:
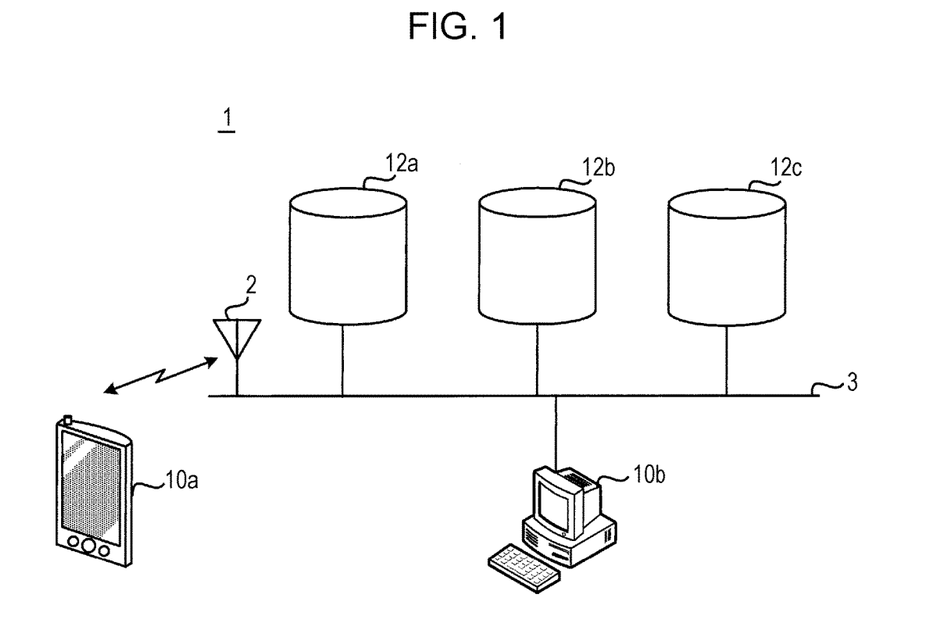
FIG. 1 illustrates a configuration of a coordinated core system in accordance with an exemplary embodiment of the present invention.

FIG. 1 illustrates a coordinated core system 1 of an exemplary embodiment of the present invention.

Referring to FIG. 1, the coordinated core system 1 of the exemplary embodiment of the present invention includes multiple terminal apparatuses 10a and 10b, and multiple core systems 12a, 12b, and 12c.

The present invention is applicable to any terminal apparatus as long the apparatus is connectable with each of the core systems 12a, 12b, and 12c. The terminal apparatuses 10a and 10b are such terminal apparatuses. In accordance with the exemplary embodiment, the terminal apparatus 10a may be a portable apparatus, such as a personal computer, a smart phone, or a tablet terminal, and the terminal apparatus 10b may be a client personal computer.

The terminal apparatus 10b and the core systems 12a, 12b, and 12c are mutually connected via a network 3.

The terminal apparatus 10a is connected to the terminal apparatus 10b, and the core systems 12a, 12b, and 12c via a wireless local area network (LAN) 2, such as Wi-Fi router, or the Internet, and transmits information to or receives information from the terminal apparatus 10b, and the core systems 12a, 12b, and 12c.

Each of the core systems 12a, 12b, and 12c stores data including a logic for each job, a screen which the logic is input to or which is referenced, a value input by a user for each job, calculation results of the logic, and a status indicating the state of software. Each of the core systems 12a, 12b, and 12c includes an interface that is referenced directly or updated by the terminal apparatus 10a or the terminal apparatus 10b. Each of the core systems 12a, 12b, and 12c has its own communication environment serving as an access criterion according to which an access is permitted, for example, an in-division access only is permitted, an in-house access only is permitted, or an access via the Internet is permitted.

Each of the terminal apparatuses 10a and 10b stores access information to each of the core systems 12a, 12b, and 12c, and gains access to each of the core systems 12a, 12b, and 12c to acquire data for jobs. Document edit software is installed on the terminal apparatuses 10a and 10b, and acquires from each of the core systems 12a, 12b, and 12c data that a user uses to perform a job. The document edit software generates a data storage module 14 as a storage module to be described below, edits document data, and references reference data as reference materials.

Each of the terminal apparatuses 10a and 10b exchanges data and the data storage module 14 having stored the data therewithin with each of the core systems 12a, 12b, and 12c. The terminal apparatuses 10a and 10b, when an identical configuration thereof is discussed, are collectively referred to as a terminal apparatus 10 in the discussion below. The core systems 12a, 12b, and 12c, if an identical configuration thereof is discussed, are collectively referred to as a core system 12 in the discussion below.

Figure 2:
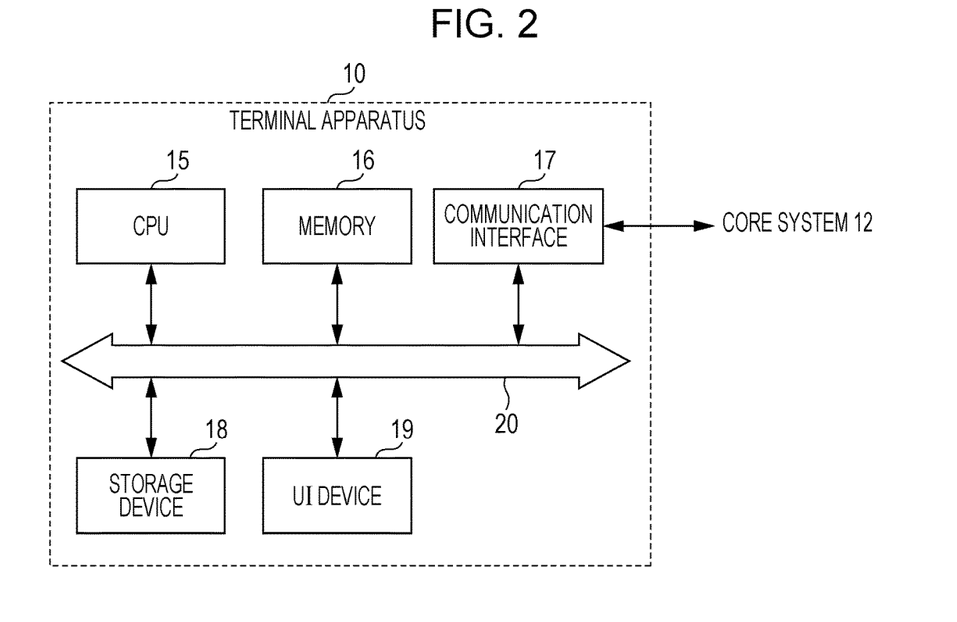
FIG. 2 is a block diagram illustrating a hardware configuration of a terminal apparatus in accordance with the exemplary embodiment of the present invention.

FIG. 2 illustrates a hardware configuration of the terminal apparatus 10 in the coordinated core system 1 of the exemplary embodiment of the present invention.

Referring to FIG. 2, the terminal apparatus 10 includes a central processing unit (CPU) 15, a memory 16, a communication interface 17 that transmits data to or receives data from an external apparatus via the network 3, a storage device 18, such as a hard disk drive (HDD), and a user interface (UI) device 19 including a keyboard and a touch panel or a liquid-crystal display. These elements are interconnected via a control bus 20.

The CPU 15 performs a predetermined process and thus controls the operation of the terminal apparatus 10 in accordance with a control program stored on the memory 16 or the storage device 18. In the exemplary embodiment, the CPU 15 reads and then executes the control program stored on the memory 16 or the storage device 18. The control program may be stored on a storage medium, such as a compact disk read-only memory (CD-ROM), and may then be read and supplied to the CPU 15.

Figure 3:
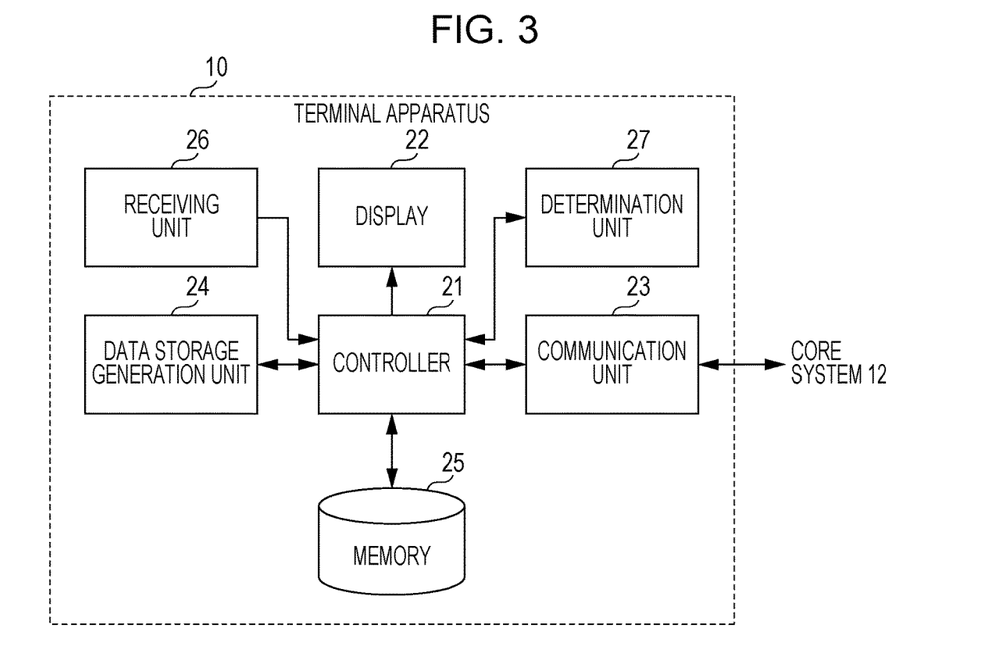
FIG. 3 is a functional block diagram of the terminal apparatus of the exemplary embodiment of the present invention.

FIG. 3 is a block diagram illustrating a functional configuration of the terminal apparatus 10 that is implemented by executing the control program.

Referring to FIG. 3, the terminal apparatus 10 of the exemplary embodiment includes a controller 21, a display 22, a communication unit 23, a data storage generation unit 24, a memory 25, a receiving unit 26, and a determination unit 27.

The receiving unit 26 receives an input from a user.

The memory 25 stores, as a cache, access information to the core system 12, and screen data acquired when the terminal apparatus 10 accesses the core system 12. The memory 25 also stores a series of operation logs related to a job performed in the past.

The display 22, controlled by the controller 21, displays data related to a series of jobs stored in the data storage module 14. The display 22 also displays a cache of a screen displayed when the core system 12 is accessed, and a cache of screen data stored on the memory 25.

The communication unit 23, controlled by the controller 21, communicates with the core system 12.

The data storage generation unit 24, controlled by the controller 21, associates and collects in the form of a single file a cache of a series of operation logs stored on the memory 25, a cache of data, such as access information to each core system 12, and a cache of the screen data of each core system 12 as the data storage module 14. In this way, the data storage generation unit 24 generates (outputs) the data storage module 14.

By expanding the data storage module 14, the controller 21 performs control to display data related to a series of jobs stored in the data storage module 14 in an order of operations on the display 22.

The determination unit 27 determines whether the terminal apparatus 10 is able to gain access to the core system 12.

In response to the determination result of the determination unit 27, the controller 21 performs control to display on the display 22 a screen presented when the core system 12 is accessed, or the cache of the screen data stored on the memory 25.

Figure 4:
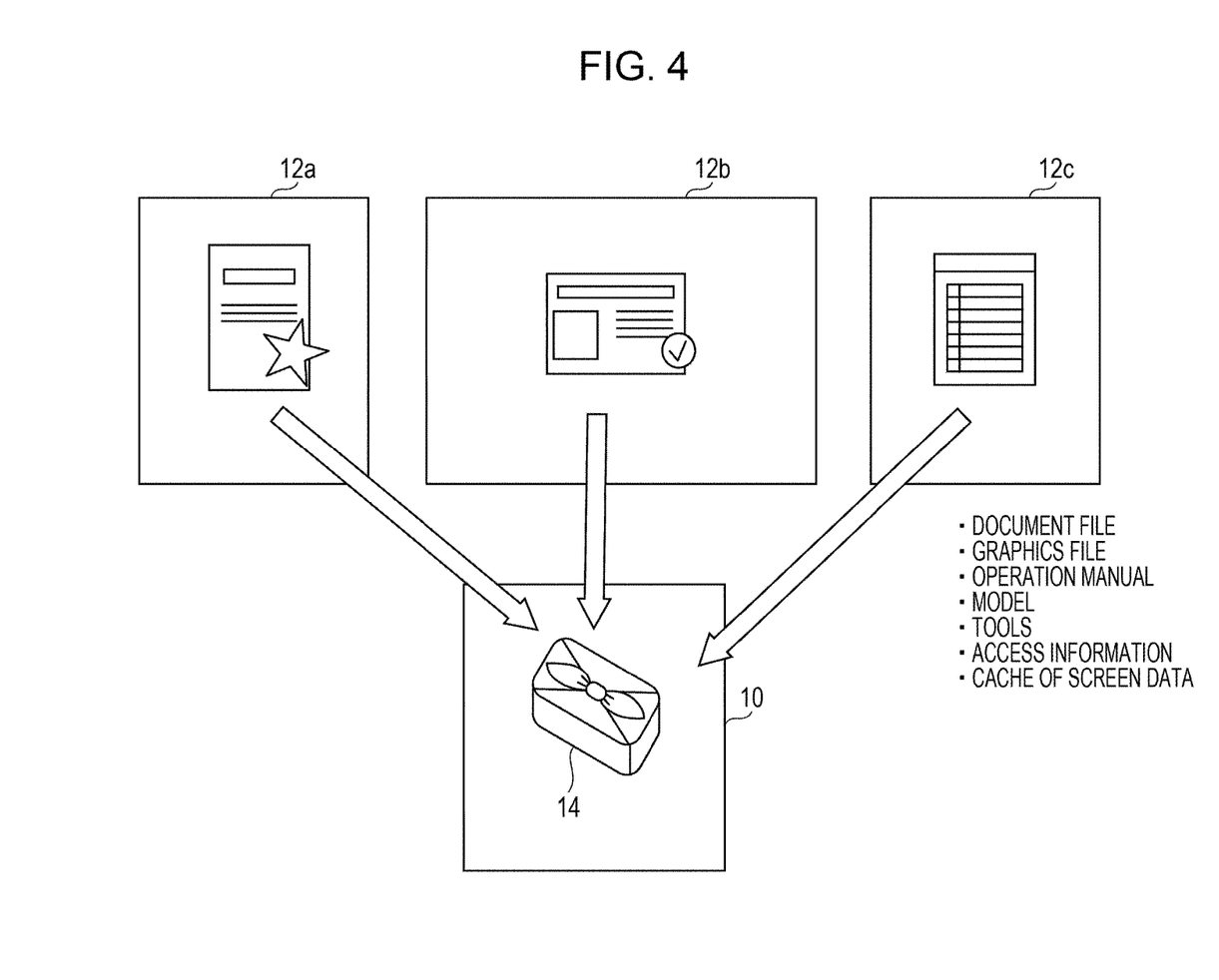
FIG. 4 illustrates a data storage module of the exemplary embodiment of the present invention.

The data storage module 14 is described in detail with reference to FIG. 4.

The data storage module 14 is a collection of a document file (document data), a graphics file (graphics data), an operation manual and its related document, a model, tools, and multiple pieces of data in a variety of data formats, such as access information to the core system 12 (including a uniform resource locator (URL), and user information). The data storage unit 14 is thus carried in a single file. Each piece of the data is associated with the screen data, as a cache, acquired when the core system 12 is accessed, and is then stored in the data storage module 14. By expanding the data storage module 14 on the terminal apparatus 10, the display 22 displays an operation method of each core system 12, an order of access to each core system 12, and a procedure of the job. The user operates the terminal apparatus 10 in accordance with a display screen, thereby efficiently performing the job.

Figure 5:
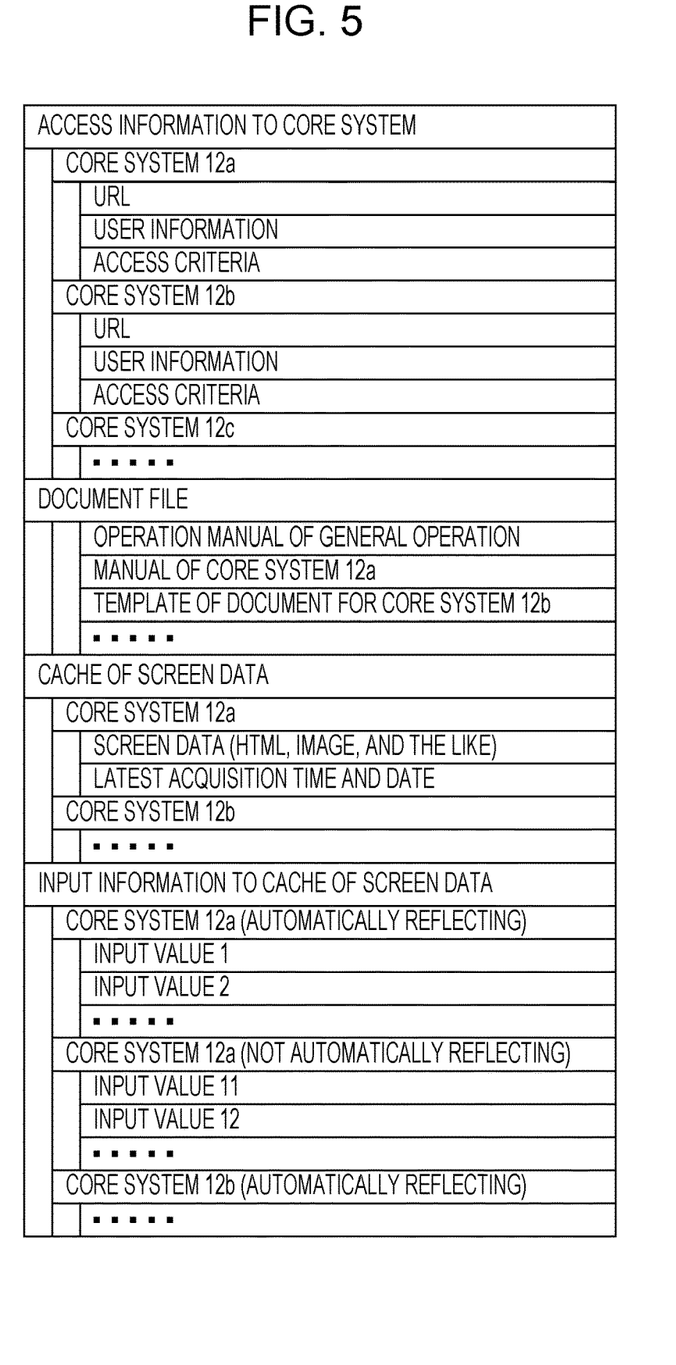
FIG. 5 illustrates an example of a data structure of the data storage module of the exemplary embodiment of the present invention.

FIG. 5 illustrates an example of a data structure of the data storage module 14.

Each of the core systems 12*a*, 12*b*, and 12*c* stores as access information for use in accessing thereto, its URL, user information, and an access criterion, such as a network and a time band for accessing.

Each of the core systems 12*a*, 12*b*, and 12*c* also stores, as a document file, information including an operation manual of the whole job, a manual of the core system 12, and a template for a document in use.

Each of the core systems 12*a*, 12*b*, and 12*c* associates, as a cache of the screen data, the screen data such as hyper text markup language (HTML) and the image of each core system 12 with the latest acquisition time and date of the screen data. In other words, the cache of the screen data is stored in a manner such that the user understands when the screen data is generated.

Each of the core systems 12*a*, 12*b*, and 12*c* stores input information in the cache of the screen data after dividing the input information into information that is automatically reflected on each core system 12 and information that is not automatically reflected, for example, a memo column.

The access information to the core system 12, the document file in use, and the cache of the screen data are collected and then stored in a single file of the data storage module 14. Information that the user has entered by referencing the cache of the screen data is managed and stored on a piece-by-piece basis. The input information is thus more easily reflected on each core system 12 in accordance with each piece of information.

Figure 6:
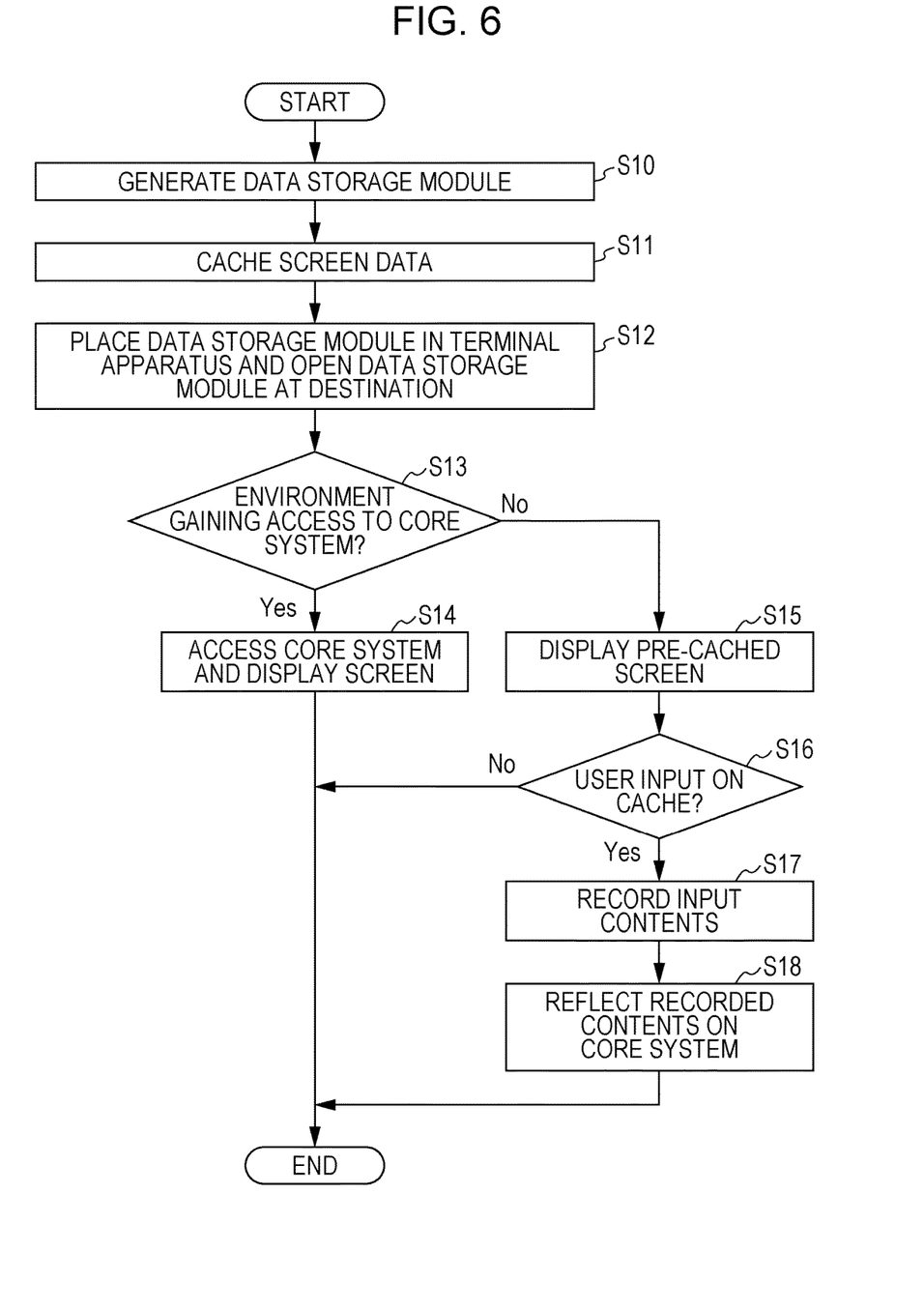
FIG. 6 illustrates a coordinated operation performed between the terminal apparatus and a core system in accordance with the exemplary embodiment of the present invention.

The coordinated operation of the terminal apparatus 10*b* with the core system 12 is specifically described with reference to FIG. 6 and FIG. 7.

In the exemplary embodiment, the terminal apparatuses 10*a* and 10*b* perform a job including a series of operations ranging from receiving a quotation of an article to a procurement action using three systems, namely, a quotation system, an approval system, and a procurement system as the core system 12. The job is described in detail below.

Step S10

The data storage module 14 is generated. More specifically, the data storage module 14 of the job ranging from receiving the quotation of the article to the procurement action is generated. Stored in the data storage module 14 are a URL of each core system 12 (each of the quotation system, the approval system, and the procurement system), the access information, such as user information, document data related to each system (document file), and the model.

Step S11

The job is advanced by expanding the data storage module 14.

Figure 7:
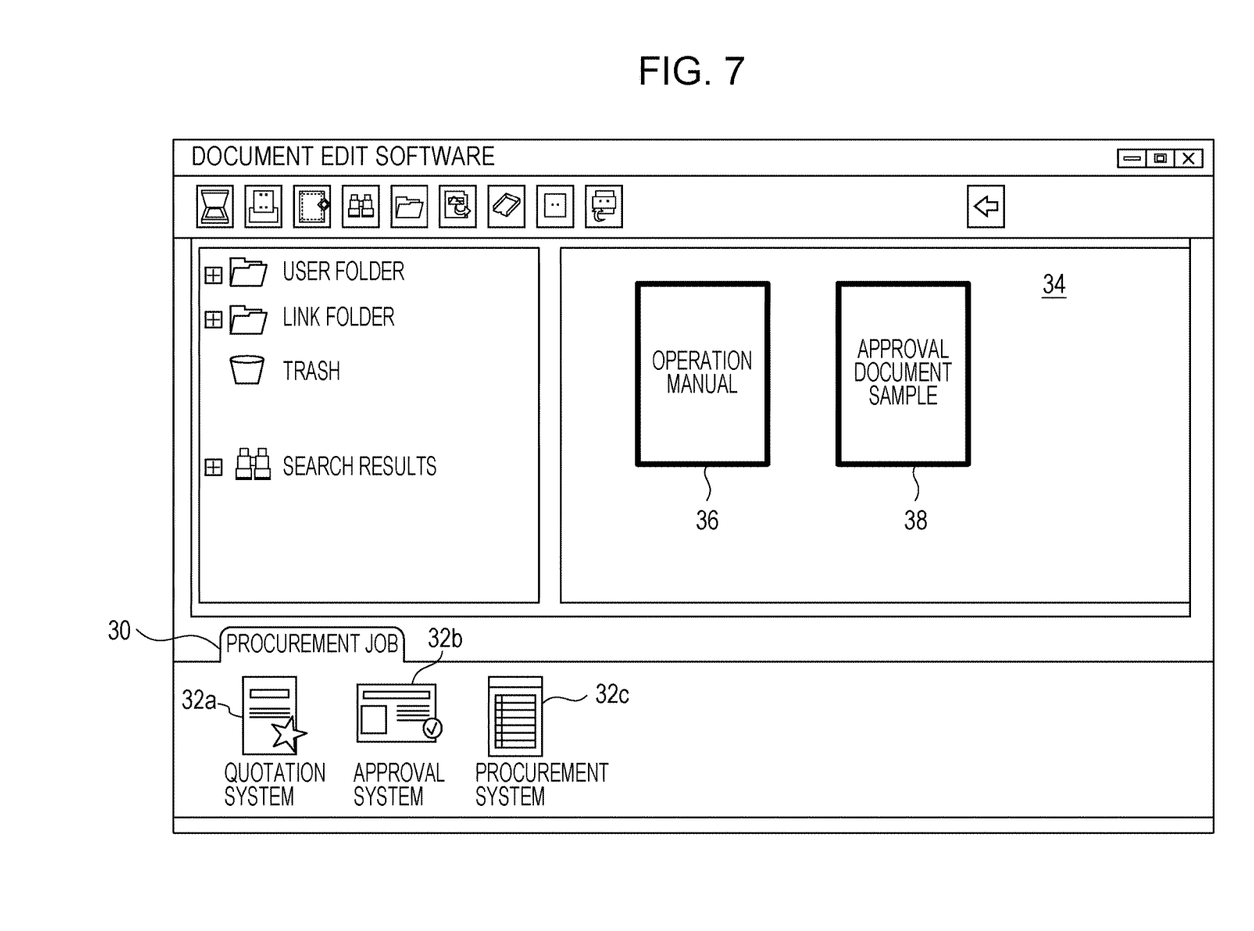
FIG. 7 illustrates an example of a display screen on which the data storage module is expanded in accordance with the exemplary embodiment of the present invention.

When the data storage module 14 is expanded, document edit software starts up, displaying a display screen of FIG. 7 on the display 22.

A tab named "procurement job" for the data storage module 14 is generated at a tool bar 30. Buttons 32 to access each core system 12 is displayed under the tool bar 30. The buttons 32 includes a button 32*a* to access the quotation system, a button 32*b* to access the approval system, and a button 32*c* to access the procurement system. Displayed in a work space 34 are an operation manual 36 related to each button 32, and document data, such as an approval document sample.

The user performs the jobs assigned for the buttons 32 on the tool bar 30 in the order from the left side to the right side. By pressing each button 32, the user accesses each core system 12 in accordance with the access information of the core system 12 stored in the data storage module 14. The screen of each core system 12 is displayed. The screen data is then acquired as a cache, and then stored in the data storage module 14. More specifically, by pressing the button 32*a*, the user accesses the quotation system in accordance with the access information stored in the data storage module 14. By pressing the button 32b, the user accesses the approval system in accordance with the access information of the approval system stored in the data storage module 14. By pressing the button 32c, the user accesses the procurement system stored in the data storage module 14. When each system is accessed, the latest screen is cached (the screen data is acquired). By accessing the quotation system, the approval system, and the procurement system in this order, the user performs the job while referencing the operation manual displayed in the work space 34. The user thus completes the series of procurement operations.

The cache of the screen data may be a collection of HTML and related data in the case of web UI system. In the case of an exclusive client other than the Web UI system, the cache of the screen data may be screen data of a screen shot or digital document into which a virtual printer has converted the screen data.

The timing when the cache of the screen data is acquired is not limited to the moment the core system 12 is accessed. At the timing when the data storage module 14 is stored in an environment where a network environment, such as the terminal apparatus 10a, may change, the core system 12 is automatically accessed, the cache of the latest screen data is automatically acquired, and then stored in the data storage module 14.

If there is a case in which the data storage module 14 may be possibly taken out of a company in cooperation with a user's schedule management system, the core system 12 is automatically accessed prior to the taking of the data storage module 14, the cache of the latest screen data is automatically acquired and stored in the data storage module 14. In this way, when the user carries the data storage module 14 with him or her, the user may automatically reference the latest screen data in a manner free from the user's conscious operation.

When the user takes the data storage module 14 out, the access criterion, such as for the in-division use only of, for the in-house use only of, or for Internet use of the core system 12, is compared with the access criterion of the destination. If there is a possibility that an inaccessible state to the core system 12 happens, the cache of the latest screen data may be automatically acquired and then stored in the data storage module 14. In this way, the cache of the screen data is generated only when it is used, and the amount of data (file size) of the data storage module 14 is reduced.

If an access time band of the core system 12 is limited, an access may be automatically made to the core system 12 immediately prior to the latest time point of the access time band, and the cache of the latest screen data may be automatically acquired and stored in the data storage module 14. Even if a job is to be performed outside the access time band, the user may perform the job by referencing the latest screen.

Step S12

The data storage module 14 is moved to the terminal apparatus 10a, and then expanded at a destination, such as a place outside a company.

Step S13

It is determined whether the terminal apparatus 10a is in an environment that allows the terminal apparatus 10a to gain access to the core system 12. More specifically, it is determined whether the terminal apparatus 10a is in an environment that allows the terminal apparatus 10a to gain access to the quotation system, the approval system, and the procurement system. If it is determined the terminal apparatus 10a is in an environment that allows the terminal apparatus 10a to gain access, the terminal apparatus 10a makes access to the core system 12 to display the latest screen (step S14). If it is determined the terminal apparatus 10a is not in an environment that allows the terminal apparatus 10a to gain access, processing proceeds to step S15.

Step S15

If the terminal apparatus 10a is not in an environment that allows the terminal apparatus 10a to gain access to the core system 12, the screen data cached in step S11 in advance is displayed. More specifically, if the terminal apparatus 10 is not in an environment that allows the terminal apparatus 10a to gain access to the quotation system, a quotation phase may be complete and a document may be being produced in an approval phase in the exemplary embodiment. In such a state, customer data and pricing data stored on the quotation system are not referenced, and the job is not performed. The user reads the cache of the screen data from the data storage module 14, and displays the cache on the work space 34, and enters data on the cached screen data. The user may produce a document for approval while referencing the cached screen data.

The data, before being input to the cached screen data, is divided into data that is reflected on the core system 12 and data that is not reflected. More specifically, before inputting the data, the user consciously divides the data into data concerning the customer data and the pricing data to be reflected on the quotation system, and a memo having contents that the user may wish to confirm later. For example, document data to be reflected may be entered into the data, and the memo may be attached to the work space 34 as an annotation of a tag. In this way, when the data is automatically reflected on the core system 12, unintended data is not reflected.

When a job is performed in accordance with the cached screen data, it is made clear that the screen data is displayed as a cache, and it is made clear when the cache is produced. In this way, the user determines whether to proceed to continue the job in accordance with the displayed cache, and whether to verify the latest data of the system at the time point of the job. Reworking is thus reduced.

The terminal apparatus 10a may be in an environment that allows the terminal apparatus 10a to gain access to the core system 12, but a communication rate may be low, and it may take time before an actual screen is displayed. In such a case, after an indication that the screen data has been displayed as a cache is displayed, and an indication as to when the cache has been produced is display, the screen of the cache is then displayed. The user may thus proceed with the job even during waiting time.

Step S16

It is then determined whether the user has entered an input on the cached screen data. If it is determined that there has not been any input by the user, it is determined that the cached screen data is only referenced, and that nothing is to be reflected on the core system 12. If it is determined that there has been an input by the user, processing proceeds to step S17.

Step S17

If there has been an input by the user on the cached screen data, the input data is stored in the data storage module 14. More specifically, document data produced for approval is stored in the data storage module 14.

Step S18

When the user has returned from his or her destination and stores the data storage module 14 onto the terminal apparatus 10b, the interface of the core system 12 is automatically called and contents of data input in step S17 is reflected on the core system 12 in accordance with coordinates of the display 22. More specifically, the document data produced for approval is reflected on the approval system. Even if the core system 12 is not accessible, an operation up to the updating of the data is performed at the timing of the job. Since the contents of update are automatically reflected when the core system 12 becomes accessible, time and labor are saved in a manner free from an interruption of the job, and reflection failure is thus controlled.

If the data of the core system 12 is updated in an environment where the core system 12 is accessible, a message is displayed to the user before automatic reflection is performed on the core system 12, and then the contents of data are verified and reflected on the core system 12. For example, if a particular word, such as "verify", is included, the message is displayed to the user for verification before the contents of data are automatically reflected on the core system 12. Even if the data is inconsistent, the user may find the inconsistent data before the automatic reflection, and may correct the data.

The data reflection on each core system 12 is not limited to the case in which the data storage module 14 is stored on the terminal apparatus 10*b* in an environment where the core system 12 is accessible. The data reflection is performed on each core system 12 when an environment is established such that the core system 12 becomes accessible with the terminal apparatus 10*a* connected to the network.

Even if a state that the core system 12 is not accessible, the user may continue the job while referencing the cached screen. More specifically, an off-line inputting is possible, increasing the efficiency of the job. Since a minimum amount of data in use is cached, the data size is small. The data is thus carried in a single file as the data storage module 14, and is easy to use on a mobile terminal apparatus.

In the exemplary embodiment, the present invention is applied to the document edit software. The present invention is not limited to the document edit software. The present invention is similarly applicable to software as long as the software includes a configuration to perform an edit operation on document data (document file), reference data, or web data.

The present invention is equally applicable not only to software that edits document data on a personal computer but also to software that performs an edit operation on document data on a portable information terminal apparatus, such as a smart phone or a tablet terminal apparatus.

A program to be executed by the information processing apparatus of the exemplary embodiment may be provided in a stored state on computer readable recording media, including a magnetic recording medium (such as a magnetic tape, a magnetic disk (such as a hard disk drive (HDD), or a flexible disk (FD)), an optical recording medium (such as an optical disk (CD), or a digital versatile disk (DVD)), a magneto-optical recording medium, and a semiconductor memory (such as a flash ROM). The program may be downloaded via a network, such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An apparatus for allowing a user to access screen information of a system when the system is not accessible by the apparatus, the system being accessible by the apparatus when the apparatus is connected to the system, the apparatus comprising:
    a processing unit that executes a program to:
    generate a storage that stores process information;
    when the system is connected to the apparatus, acquire a cache of the screen information of the system;
    when a request to execute a process is received, determine whether the apparatus is in an environment that allows the apparatus to gain access to the system;
    when the apparatus is not in an environment that allows the apparatus to gain access to the system, display the cache of the screen information;
    when the apparatus is in an environment that allows the apparatus to gain access to the system, access the system to display a latest screen of the screen information;
    acquire the screen information of the system to be used in the process when the storage is generated; and
    acquire the screen information from the system if connection to the system is limited.

2. The apparatus according to claim 1, wherein the processing unit further executes the program to acquire the screen information of the system to be used in a first operation of a process from among multiple processes.

3. The apparatus according to claim 1, wherein the processing unit further executes the program to acquire all the screen information of the system to be used in a process from among multiple processes.

4. The apparatus according to claim 1, wherein the processing unit further executes the program to acquire the screen information of the system to be used in the execution of the process if the request to execute the process is received.

5. The apparatus according to claim 4, wherein the processing unit further executes the program to acquire the screen information of the system corresponding to time at which the request to execute the process is received.

6. The apparatus according to claim 4, wherein the processing unit further executes the program to acquire the screen information of the system to be used in a process subsequent to the process the execution request of which has been received.

7. The apparatus according to claim 1, wherein the processing unit further executes the program to acquire the screen information from the system if the storage is taken out.

8. The apparatus according to claim 7, wherein the processing unit further executes the program to acquire the screen information from the system if the storage is moved to a mobile terminal.

9. The apparatus according to claim 7, wherein the processing unit further executes the program to acquire the screen information from the system if a storage device that stores a schedule indicates that time to take out the storage has come.

10. The apparatus according to claim 7, wherein the processing unit further executes the program to acquire the screen information from the system if a comparison result between a connection condition to the system and a condition of a destination determines that the destination is not connectable with the system.

11. The apparatus according to claim 1, wherein the screen information is data acquired during the latest connection with the system.

12. The apparatus according to claim 1, wherein the processing unit further executes the program to display a screen indicating that the screen information has been acquired in advance.

13. The apparatus according to claim 1, wherein the processing unit further executes the program to display a time and date on which the screen information has been acquired.

14. The apparatus according to claim 1, wherein the processing unit further executes the program to display the screen information if a connection time period during which the system remains connected is equal to or longer than a predetermined threshold.

15. The apparatus according to claim 1, wherein, if the system is connectable, the processing unit further executes the program to display a display screen acquired when the system is connected.

16. The apparatus according to claim 1, wherein the processing unit further executes the program to:

receive an input to the screen information; and if the apparatus is connected with the system, update data of the system in response to the input received.

17. The apparatus according to claim 16, wherein the processing unit further executes the program to update the data of the system in response to an input related to the updating of the data of the system by determining whether or not the input is related to the updating of the data of the system.

18. The apparatus according to claim 16, wherein, prior to the updating, the processing unit further executes the program to verify whether or not the data of the system is to be updated.

* * * * *